June 7, 1932.  G. W. EMRICK  1,862,370
CHUCK DEVICE
Filed Jan. 28, 1931
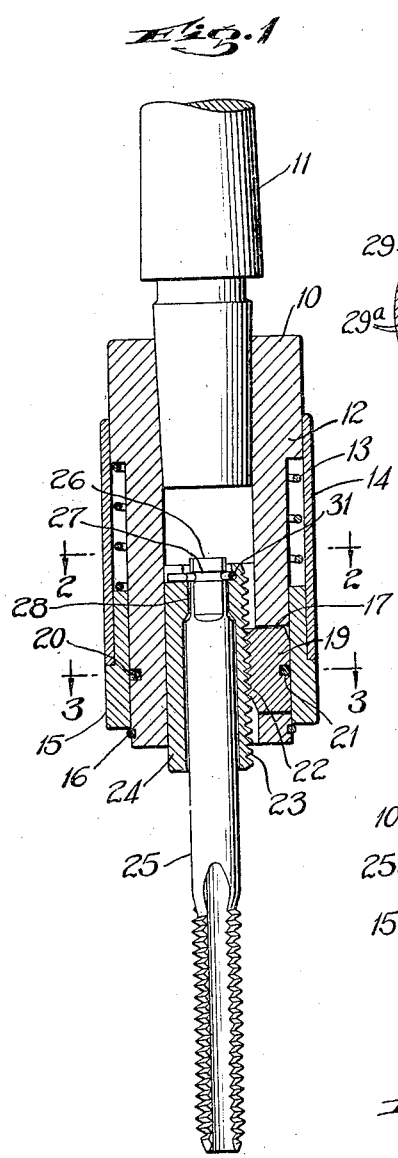
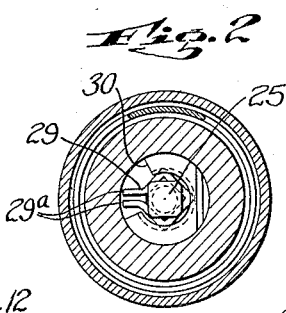
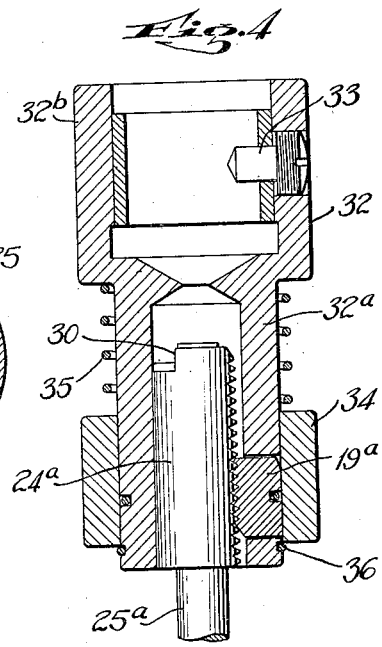
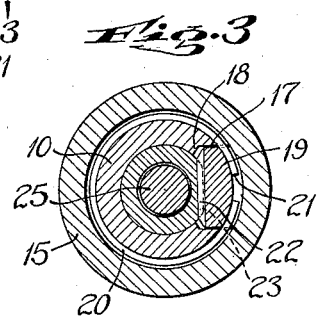
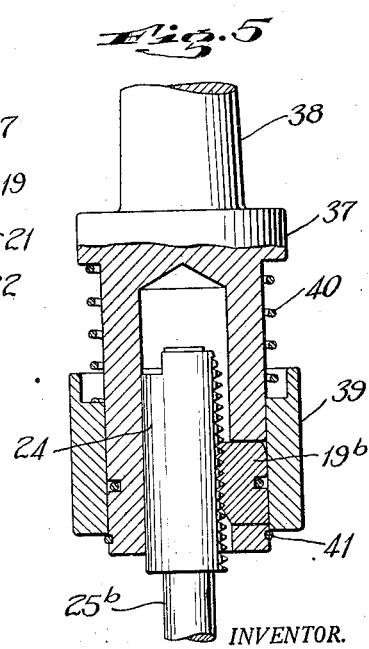
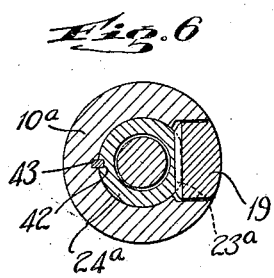
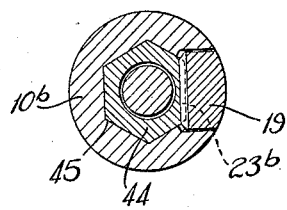
INVENTOR.
George W. Emrick
BY
ATTORNEY.

Patented June 7, 1932

1,862,370

UNITED STATES PATENT OFFICE

GEORGE W. EMRICK, OF BROOKLYN, NEW YORK

CHUCK DEVICE

Application filed January 28, 1931. Serial No. 511,779.

This invention relates to chuck devices adapted to support taps, drills, reamers and similar tools in connection with suitable machines to perform the desired operations characterized by the tool employed as well as in supporting tool adapters in connection with the chuck; and the object of the invention is to provide a device of the class specified employing a dog or key member movably supported in the body of the chuck and by means of which a suitable tool or tool adapter may be adjustably mounted and keyed within the chuck body for the purpose of governing the length of the tool and for alining one tool with another tool or tools in a multiple head; a further object being to provide tensional means for supporting the dog or key member against displacement from the chuck body and to exert pressure on the dog upon the tool or tool adapter when employed with the chuck; a further object being to provide means movably supported on the chuck body for controlling the movement of the dog and for retaining the same in firm engagement with the tool when properly adjusted in the chuck; a further object being to provide means for detachably supporting a tool adapter in connection with the tool in such manner as to prevent rotation of the tool with respect to the adapter and longitudinal movement with respect thereto, and to provide in such tools as taps a clearance between the tool and adapter permitting slight, radial movement of the tool with respect to the adapter; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a longitudinal, sectional view through a chuck made according to my invention, illustrating one method of attaching a tool thereto.

Fig. 2 is a section on the line 2—2 of Fig. 1.

Fig. 3 is a section on the line 3—3 of Fig. 1, with part of the construction removed.

Fig. 4 is a view similar to Fig. 1 showing a modification.

Fig. 5 is a view similar to Figs. 1 and 4 showing another modification.

Fig. 6 is a view similar to Fig. 3 omitting part of the construction and showing a modification; and, Fig. 7 is a view similar to Fig. 6 showing another modification.

In the construction shown in Fig. 1 of the drawing, I employ a chuck consisting of a main tubular body 10 to the upper end of which is attached a spindle 11. The lower end portion of the tubular body is slightly reduced to form a shoulder 12 forming a seat for a spring 13 contained within a sleeve 14 slidably mounted on the body 10, the lower end of which is provided with a collar 15 secured thereto. The inner end of the collar seats upon the spring 13 and the lower end is adapted to engage a split stop ring 16 mounted in the periphery of the body 10 at the lower end thereof.

One side of the lower end portion of the body 10 is provided with a radial aperture 17, the inner end of which terminates in a stop shoulder 18, which limits the inward movement of a dog or key 19. The outer surface of the dog 19 is arc-shaped in form to correspond with the curvature of the periphery of the body 10 when the dog is moved inwardly by a spring ring 20 mounted in a ring groove arranged centrally of the aperture 17 and dog 19. The dog has a groove 21 in which the ring 20 seats. The inner end of the dog 19 has a plurality of vertically spaced teeth or projections 22 adapted to engage corresponding teeth or projections 23 on a tool adapter 24 in the form of a sleeve, in connection with which a tool 25 is employed, the tool being shown in the form of a tap in Fig. 1 of the drawing. It will be understood that the teeth 23 are arranged vertically on one side wall of the sleeve 24 and permit the inward and outward adjustment of said sleeve with respect to the body 10 to vary the length of projection of the tool 25.

In the construction shown, the tool 25 is provided with a square upper end 26 and this square end is fashioned to form a substantially annular groove 27 by removing the corner portions of the square. The sleeve 24 has a square aperture 28 in the upper end thereof in which the squared end 26 of the tool fits to key the sleeve to the tool against relative, rotary movement.

The tool is held against longitudinal movement with respect to the sleeve by an adjustable key member 29 in the form of a substantially square spring ring having free and relatively movable end portions 29a which operate in a notch or recess 30 formed in one side wall of the sleeve at its upper end. The member or ring 29 seats under tension, in a groove 31 formed in the rectangular aperture or bore 28 of the sleeve. The member 29, when in the position shown in Fig. 2 of the drawing, serves to key and lock the tool 25 against displacement with respect to the sleeve 24; but, by rotating the member 29 through an arc of substantially 45 degrees, the square contour thereof will be brought into alinement with the square head 26 and the square bore 28, facilitating the detachment of the tool as will be apparent.

It will also be noted that the bore of the sleeve 24 is slightly larger than the diameter of the shank of the tool 25 so as to provide free movement of the tool within the sleeve, permitting the tool to find its own center in operating upon a workpiece and especially in tapping operations. In other types of tools, this clearance is not essential, nor in fact, desirable. Therefore, it will be apparent that I am not necessarily limited to the provision of this clearance.

In Fig. 4 of the drawing, I have shown a modified form of chuck body 32, the lower end 32a of which is substantially similar to the reduced end of the body 10. The upper end 32b is enlarged to receive a support which may be secured to the body 32 by a set screw or key pin 33 as will be apparent. In this form of construction, a plain collar 34 is arranged upon the reduced end 32a of the body and is slidable longitudinally thereof against the action of a spring 35. The lower end of the collar 34 operates upon a stop ring 36 mounted in the periphery of the chuck body. This construction also employs a dog or key 19a similar to the key 19 and arranged in the wall of the chuck body and cooperating with a sleeve 24a similar to the sleeve 24, said sleeve supporting a suitable tool 25a as in the construction shown in Fig. 1.

In Fig. 5 of the drawing, I have shown another modification wherein a chuck body 37 has an integral shank 38 at the upper end thereof and a collar 39 is movable longitudinally of the chuck body against the action of a spring 40. The collar is retained against accidental displacement and is limited in one directional movement by a stop ring 41 on the periphery of the chuck body. The construction shown in Fig. 5 employs a dog or key 19b similar to the dog 19 shown in Fig. 1 and a sleeve 24b similar to the sleeve 24 is employed for supporting a tool 25b.

In Figs. 4 and 5 of the drawing, the detail description of the parts 19, 24 and 25 disclosed in Fig. 1, is not repeated, in that the structures of these parts are identical.

In the use of my improved chuck device, it will be understood that after the parts of the chuck body have been assembled, a tool including its adapter sleeve may be detachably coupled with the chuck and adjusted with respect thereto by moving the collar 15, 34, 39 longitudinally of the respective chuck body sufficiently to disengage the dog or key employed. In the operation of inserting the sleeve 24 into the bore of the chuck body, the teeth or projections 23 thereon will engage the teeth 22 forcing the dog outwardly against the action of the spring 20 until the desired position of adjustment is reached, after which the collar is returned to its normal position to support and hold the dog against outward movement, thus locking the sleeve 24 in the position of adjustment previously fixed. In order to readjust a tool or the sleeve 24 thereon or to disengage the same from the chuck, it is first necessary to move the collar 15 out of engagement with the dog 19 as will be apparent. It will also be understood that the tools 25 may be attached and detached with respect to the collar 24 whenever desired by the operation of the member 29 as heretofore pointed out.

In Fig. 6 of the drawing, I have shown a slight modification wherein the sleeve 24 is provided with a longitudinal, key groove 42 adapted to receive a key 43 mounted in the bore of the chuck body 10a, the groove 42 being preferably arranged in a wall opposed to the teeth or projections 23a. This construction provides a direct key coupling of the sleeve 24a with the chuck body 10a.

In Fig. 7 of the drawing, I have shown another method of keying the sleeve to the body 10b. In this figure, a sleeve 44 of hexagonal or other angular cross sectional form is employed, and the bore 45 of the body 10b will be of corresponding cross sectional form. It will be understood that one flat wall of the sleeve 44 will have the teeth 23b thereon for engagement with the member 19.

The structures shown in Figs. 6 and 7 are adapted primarily for use when the tools inserted into the chuck are subjected to heavy stresses and strains, it being understood that the members 19, 19a and 19b serve as keys preventing the rotation of the tools in the chuck body.

It will be understood that with my improved chuck construction, tools of various kinds and classes may be quickly coupled and uncoupled therewith as well as adjusted with respect thereto to suit different operating conditions. While it is preferred to employ the adapted or sleeve 24 herein disclosed, it will be understood that my invention is not necessarily limited in this respect, as any means may be provided for forming the adjustable coupling between the tool and the chuck body through the dog or key member 19. Various other changes in and modifications of the construction herein shown and described may be made within the scope of the appended claims without departing from the spirit of my invention or sacrificing its advantages.

Having fully described my invention, what I claim as new and desire to secure by Letters Patent, is:

1. An adjustable tool supporting chuck of the class described comprising a chuck body having a tool receiving chamber at one end thereof, the tool insertable into said chamber including a plurality of longitudinally spaced elements arranged in close proximity to each other, a member mounted in the chuck body and movable radially with respect to and opening into the chamber thereof, the inner surface of said member having a plurality of elements spaced longitudinally of the chamber adapted to engage a plurality of the elements on said tool in adjustably supporting the tool in the chuck body, and means movably supported on the chuck body cooperating with said member for retaining the same in firm engagement with the tool supported therein.

2. An adjustable tool supporting chuck of the class described comprising a chuck body having a tool receiving chamber at one end thereof, the tool insertable into said chamber including a plurality of longitudinally spaced elements arranged in close proximity to each other, a member mounted in the chuck body and movable radially with respect to and opening into the chamber thereof, the inner surface of said member having a plurality of elements spaced longitudinally of the chamber adapted to engage a plurality of the elements on said tool in adjustably supporting the tool in the chuck body, means movably supported on the chuck body cooperating with said member for retaining the same in firm engagement with the tool supported therein, and the interengaging elements being arranged on flat surfaces on said tool and member whereby the tool is keyed by said member against rotary movement in the chuck body.

3. An adjustable tool supporting chuck of the class described comprising a chuck body having a tool receiving chamber at one end thereof, the tool insertable into said chamber including a plurality of longitudinally spaced elements arranged in close proximity to each other, a member mounted in the chuck body and movable radially with respect to and opening into the chamber thereof, the inner surface of said member having a plurality of elements spaced longitudinally of the chamber adapted to engage a plurality of the elements on said tool in adjustably supporting the tool in the chuck body, means movably supported on the chuck body cooperating with said member for retaining the same in firm engagement with the tool supported therein, the interengaging elements being arranged on flat surfaces on said tool and member whereby the tool is keyed by said member against rotary movement in the chuck body, and a spring ring for keying said member against rotary movements and for retaining the same against accidental displacement from the chuck body when said first named means is out of engagement therewith.

4. An adjustable tool supporting chuck of the class described comprising a chuck body having a tool receiving chamber at one end thereof, the tool insertable into said chamber including a plurality of longitudinally spaced elements arranged in close proximity to each other, a member mounted in the chuck body and movable radially with respect to and opening into the chamber thereof, the inner surface of said member having a plurality of elements spaced longitudinally of the chamber adapted to engage a plurality of the elements on said tool in adjustably supporting the tool in the chuck body, means movably supported on the chuck body cooperating with said member for retaining the same in firm engagement with the tool supported therein, and the elements of said tool being arranged upon a sleeve and means on said sleeve for detachably supporting and keying a tool proper in connection therewith.

5. A chuck device of the class described having a tool receiving bore arranged axially of one end thereof, a member mounted in said device to move radially with respect to the bore thereof, said member opening into the bore, means limiting the inward movement of said member, tensional means for supporting said member against accidental outward displacement with respect to the device, the surface of said member exposed to said bore having a plurality of inwardly projecting, closely arranged key elements spaced longitudinally with respect to the bore, the surface of said member having the elements thereon being flat, a tensionally controlled sleeve slidably engaging the chuck device and cooperating with said member to normally support the same in its innermost position, and a split ring mounted on the chuck device for limiting the movement of said sleeve in one direction.

In testimony that I claim the foregoing as my invention I have signed my name this 22nd day of January, 1931.

GEORGE W. EMRICK.